United States Patent [19]

Levenberg

[11] Patent Number: 5,641,046

[45] Date of Patent: Jun. 24, 1997

[54] BI-DIRECTIONAL CLUTCH

[75] Inventor: Nat Levenberg, Lynbrook, N.Y.

[73] Assignee: Alvin Levenberg, Baldwin, N.Y.

[21] Appl. No.: 564,482

[22] Filed: Nov. 29, 1995

[51] Int. Cl.$^6$ .............................. F16D 13/04; F16D 13/40
[52] U.S. Cl. ...................... 192/54.5; 192/93 A; 192/95; 192/100
[58] Field of Search ............................. 192/54.5, 54.51, 192/54.52, 19, 100, 95, 93 A, 31, 32

[56] References Cited

U.S. PATENT DOCUMENTS

| 40,046 | 9/1863 | Jones | 192/19 X |
|---|---|---|---|
| 63,800 | 4/1867 | Jones | 192/19 X |
| 160,617 | 3/1875 | Rowland | 192/19 X |
| 203,808 | 5/1878 | Williamson | 192/93 A |
| 2,814,372 | 11/1957 | Hussa | 192/93 A X |
| 2,985,113 | 5/1961 | Cotesworth | 192/93 A X |

*Primary Examiner*—Rodney H. Bonck
*Attorney, Agent, or Firm*—Charles E. Temko

[57] ABSTRACT

A bi-directional clutch particularly suited for hand-powered applications where motion is imparted to a pulley. The device includes a pair of wedge-shaped circular plates each of which is urged to a disengaged or idle position under the force of gravity when no motion is being transmitted. Imparted rotational movement in either direction brings an angled surface of a driving plate into contact with a corresponding angled surface of a driven plate which motion pushes an opposite surface of the driven plate into contact with a side surface of the pulley for transmitting corresponding rotation.

6 Claims, 4 Drawing Sheets

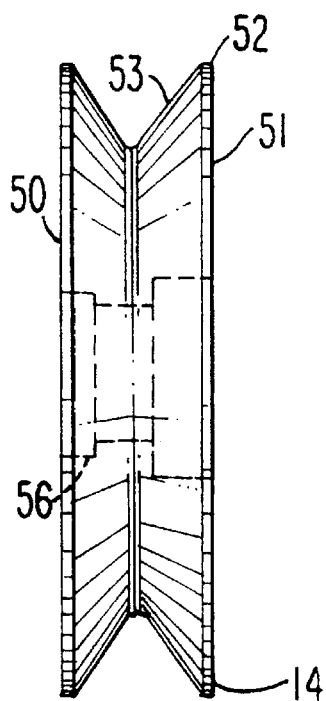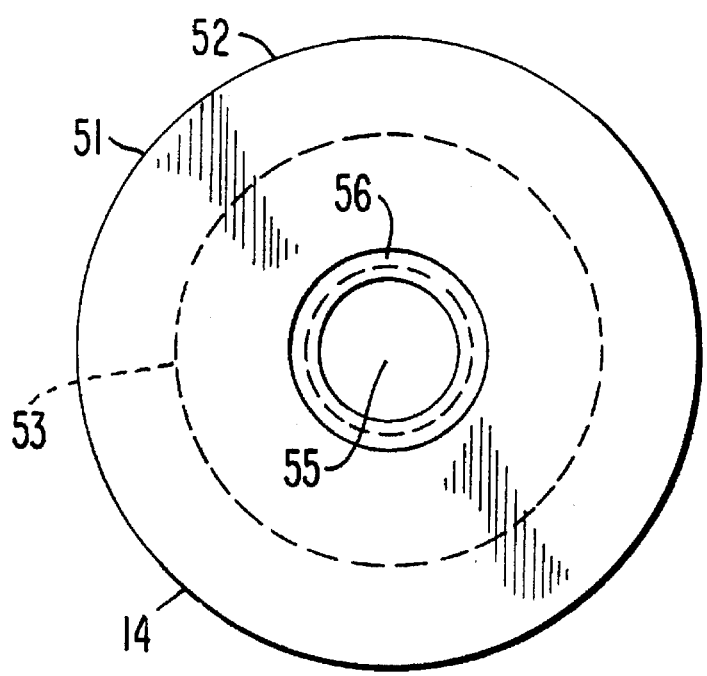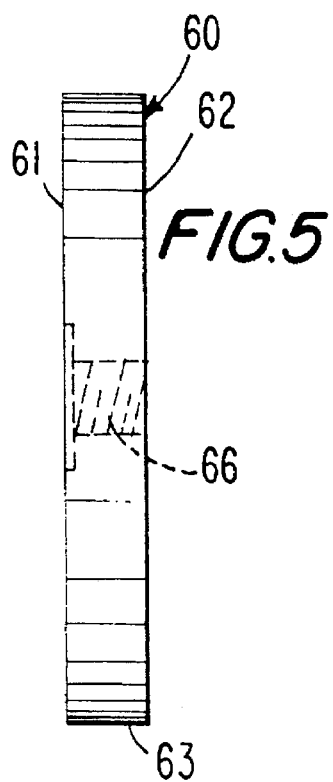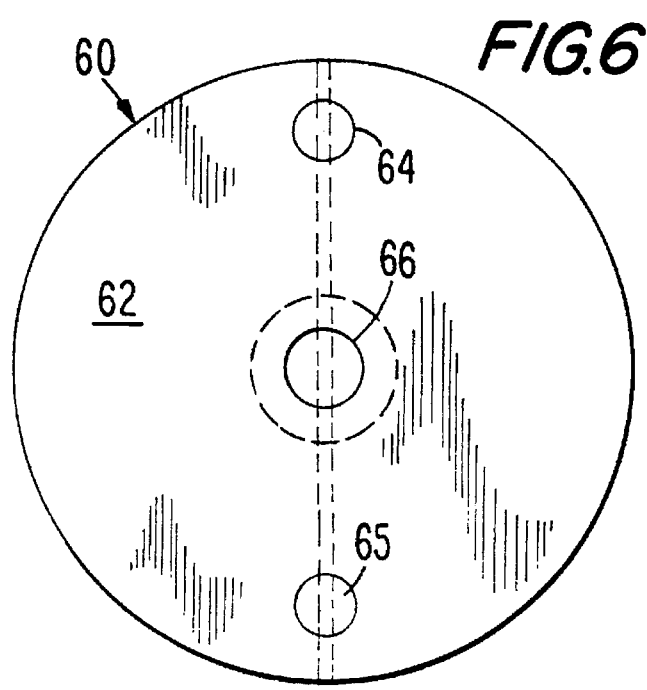

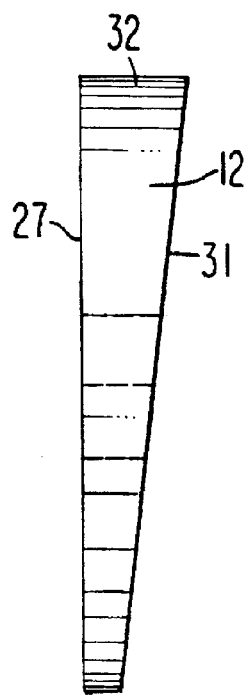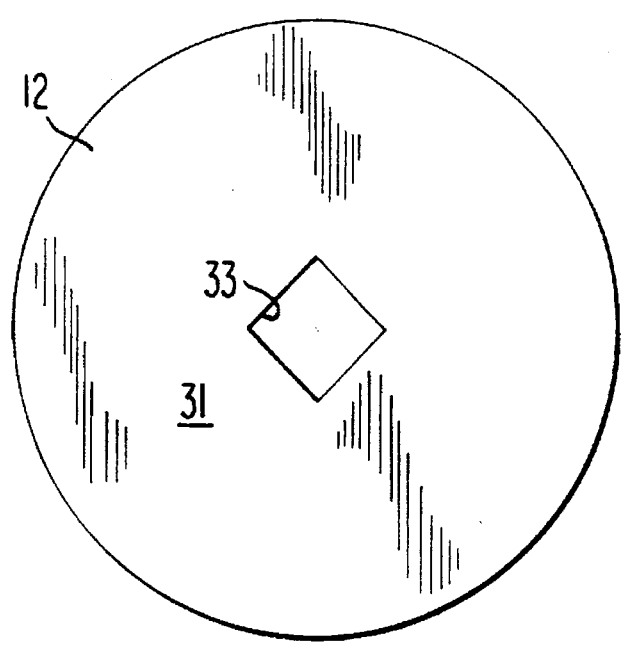
FIG.7  FIG.8
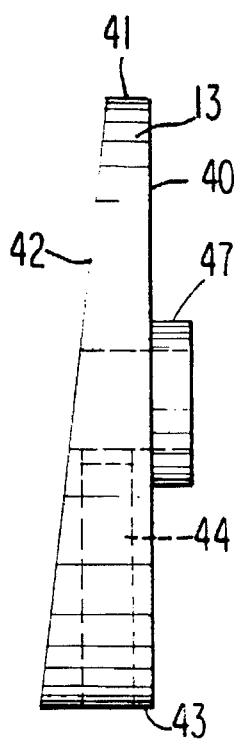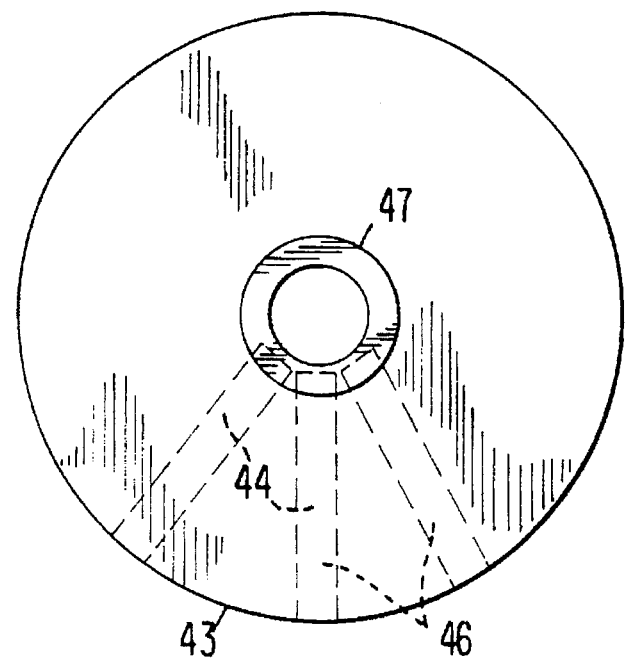
FIG.9  FIG.10

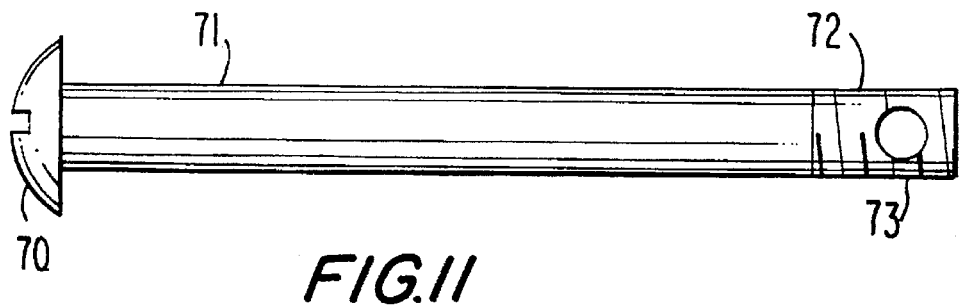
FIG.11
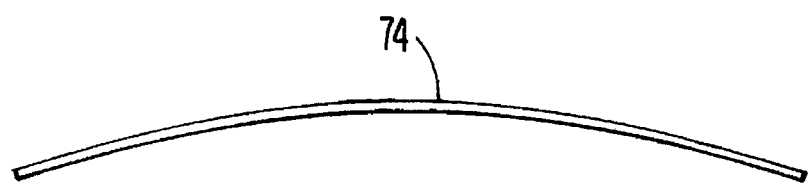
FIG.12
FIG.14
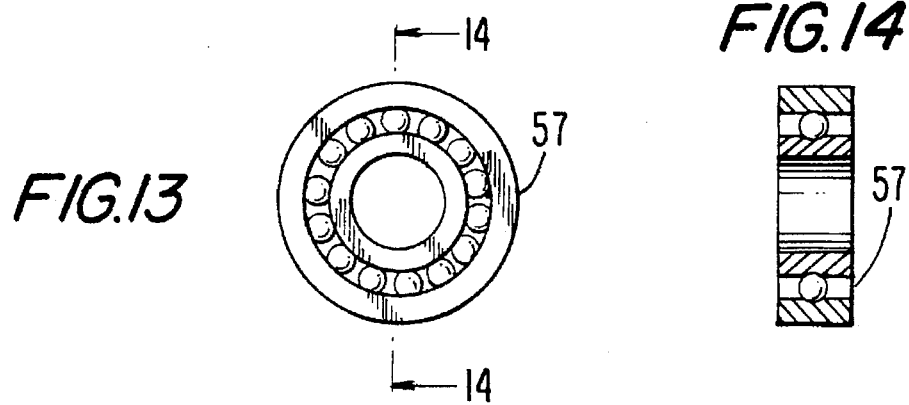
FIG.13

BI-DIRECTIONAL CLUTCH

BACKGROUND OF THE INVENTION

This invention relates generally to the field of small motion-transmitting clutches. Such clutches are useful, for example, in the operation of window, blind, and drapery hardware, where the span is relatively large, and the drapery supported is relatively heavy. Other uses include hand operated fishing reels and similar applications requiring a free running driven member and movement in at least one rotational direction under power. The field of light duty clutches for hand powered operation is a well developed art. In the field of drapery hardware, for example, it is known to impart movement in either of two directions with a disengaged condition therebetween. This is usually accomplished by a pair of overrunning clutches, one for either direction. Each clutch involves a relatively large number of parts with rather complicated manufacture and assembly. Free running of an output pulley requires manipulation of a cord to a predetermined position.

SUMMARY OF THE INVENTION

Briefly stated, the invention contemplates the provision of an improved clutch suitable for manually powered operation in which the number of component parts has been reduced to a minimum, which parts are readily fabricated as castings from metallic or synthetic resinous materials to commercial tolerances. Unlike prior art devices, the disclosed embodiment provides for automatic disengagement upon the cessation of motion transmission making the construction ideal for manual operation. Essentially, the device includes a manually engageable crank having a motion transmitting or driving wedge-shaped plate connected thereto. The driving plate includes an angled surface which engages a corresponding angled surface on a driven plate upon rotation in either direction through a small arc. The engagement also transmits an axial force which causes the driven plate to shift axially away from the driving plate to engage a side surface of an adjacent pulley or gear thereby transmitting motion to the pulley and an engaged belt or cord. When the crank is released, it rotates under the action of gravity to a predetermined position. Upon this occurrence, the driven plate also moves to a predetermined rotational position to release the pulley. The pulley is supported axially at an opposite side by a thrust bearing.

BRIEF DESCRIPTION OF THE DRAWING

In the drawings, to which reference will be made in the specification, similar reference characters have been employed to designate corresponding parts throughout the several views.

FIG. 3 is a side elevational view of a pulley.

FIG. 4 is an end elevational view of the pulley shown in FIG. 3.

FIG. 5 is a side elevational view of a mounting base.

FIG. 6 is an end elevational view of the base.

FIG. 7 is a side elevational view of a driver plate.

FIG. 8 is an end elevational view of the driver plate.

FIG. 9 is a side elevational view of a driven plate.

FIG. 10 is an end elevational view of the driven plate.

FIG. 11 is a side elevational view of an axial pintle.

FIG. 12 is a side elevational view of a retaining pin.

FIG. 13 is an elevational view of a thrust bearing.

FIG. 14 is a sectional view of the thrust bearing as seen from the plane 14—14 in FIG. 13.

DETAILED DESCRIPTION OF THE DISCLOSED EMBODIMENT

Figure 1:
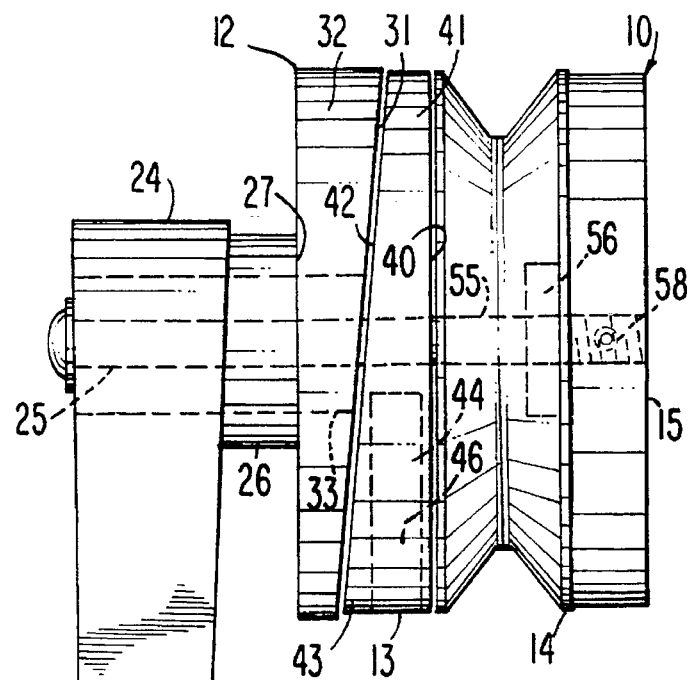
FIG. 1 is a side elevational view of an embodiment of the invention.

In accordance with the invention, the device, generally indicated by reference character 10, comprises broadly: a crank element 11, a driving plate 12, a driven plate 13, a driven pulley 14, and a fixed mount or base element 15.

Figure 2:
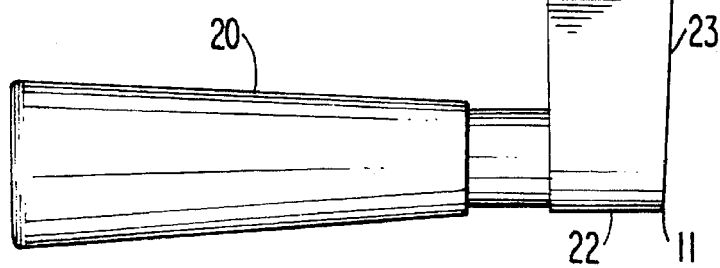
FIG. 2 is a side elevational view of a shaft forming a part of the embodiment.

The crank element 11 includes a manually engageable handle 20 interconnected by a pintle (not shown) to the free end 22 of a lever 23. A rotating end 24 engages an axial shaft 25 (FIG. 2) having a non-circular configuration which extends through an axially extending projection 26 having a radially extending surface 27.

The driving plate 12 (FIGS. 7–8) may be formed as a plastic molding or metallic casting mold. It is bounded by the above-mentioned surface 27, and angularly disposed surface 31, the plane of which is disposed at between 5 and 10 degrees from plane normal to the principal axis, and a cylindrical surface 32. A square bore 33 contains a square segment 34 of a drive shaft 35, the shaft having a round segment 36 which turns freely in the plate 13 and pulley 14 (see FIG. 2).

The driven plate 13 is bounded by a radially extending surface 40, a cylindrical surface 41, and an angularly disposed surface 42 which selectively engages the surface 31 of the plate 12. A circular portion 43 may be provided with optional cylindrical recesses 44 which are filled with corresponding elongated weights 46, the purpose of which will become more clearly apparent. An extension 47 extending from the radial surface 40 engages a corresponding bore 48 in the driven pulley 14 to provide stability.

The driven pulley is generally conventional in configuration, and includes first and second end surfaces 50 and 51, as well as a peripheral surface 52 which defines a V groove 53 to accommodate a motion transmitting V-belt (not shown). A cylindrical bore 55 includes a circular recess 56 to accommodate a thrust bearing 57 (FIGS. 13–14).

The mount or base 15 will vary in configuration depending upon the locus of installation. As illustrated, it includes a circular plate 60 bounded by first and second end surfaces 61 and 62 as well as a peripheral surface 63. Mounting holes 64 and 65 provide, means for attaching the plate to a fixed surface. A tapped bore 66 engages an axially aligned screw 25 which forms an axle, and includes a slotted head 70, a smooth shank 71, and a threaded end 72. A transverse bore 73 accommodates a retaining pin 74 which permits adjustment of the screw 25 to take up wear.

Operation of the clutch will be apparent from a consideration of FIG. 1. As shown, the component parts are in disengaged condition, and the pulley 14 is free to rotate. Upon rotation of the handle 20, the angularly disposed surfaces 31 and 42 will contact each other, thus engaging the clutch. Continued rotation also imparts a degree of axial movement which moves the driven plate 13 into contact with the end surface 50 of the pulley which is prevented from moving rightwardly by the thrust spring 57. Thus, as the crank is rotated in either direction, motion is transmitted from the crank to the pulley and a motion transmitting belt (not shown). When the handle 20 is released, it will move under the action of gravity again to the position shown in FIG. 1, moving with it the driven plate 13 until the position shown in FIG. 1 is reached, at which time the clutch becomes fully disengaged to again permit free rotation of the pulley 14.

It may thus be seen that I have invented a novel and highly useful bi-directional clutch suitable for manually transmitted motion which comprises only five major parts, each of which is readily fabricated. The component parts are held together by a single pintle which is adjustable for wear, and when disassembly is required, this is accomplished by merely removing the pintle. The cost of fabrication may be of a very low order, and preferably, all of the major components are formed as plastic moldings or metallic castings.

I wish it to be understood that I do not consider the invention to be limited to the precise details of structure shown and set forth in the specification, for obvious modifications will occur to those skilled in the art to which the invention pertains.

I claim:

1. A bi-directional clutch for transmitting rotational motion comprising: a fixed mounting element including a mounting pintle, means for transmitting manually imparted rotational motion, a driven plate fixed to said motion transmitting means, a driver plate positioned for relative axial and rotational movement relative to said driven plate, having a radially extending surface thereon, a pulley having a radially extending surface thereon selectively frictionally contacting said radially extending surface on said driven plate; said driver plate and driven plate each having corresponding angularly oriented surfaces selectively contacting each other upon transmission of motion to said motion transmitting means in either direction; said transmission of motion serving to axially displace said driven plate into frictional contact with said pulley.

2. A clutch in accordance with claim 1, further comprising a motion transmitting drive shaft surrounding said pintle and interconnecting said motion transmitting means and said driven plate.

3. A clutch in accordance with claim 1, said motion transmitting means being in the form of a crank.

4. A clutch in accordance with claim 3, in which said crank in the absence of imparted motion returns to a predetermined position under the force of gravity, with said driven plate returning to a predetermined position under the force of gravity to place said clutch in disengaged condition.

5. A clutch in accordance with claim 1, in which the angled faces of said driver and driven plates are disposed at an angle of 5 to 10 degrees relative to the axis of said pintle.

6. A clutch in accordance with claim 1, said driven plate having a center of gravity which is displaced from its rotational axis.

* * * * *